(12) United States Patent
Takemoto et al.

(10) Patent No.: US 7,198,039 B2
(45) Date of Patent: Apr. 3, 2007

(54) VALVE CONTROL DEVICE REDUCING NOISE

(75) Inventors: Eiji Takemoto, Obu (JP); Masato Katsuno, Anjo (JP); Tatsuya Fujita, Obu (JP); Kunio Nanba, Anjo (JP); Yoshinori Nakayama, Hoi-gun (JP)

(73) Assignees: Denso Corporation (JP); Nippon Soken, Inc. (JP)

( * ) Notice: Subject to any disclaimer, the term of this patent is extended or adjusted under 35 U.S.C. 154(b) by 0 days.

(21) Appl. No.: 11/330,118

(22) Filed: Jan. 12, 2006

(65) Prior Publication Data

US 2006/0162693 A1   Jul. 27, 2006

(30) Foreign Application Priority Data

Jan. 26, 2005  (JP)  ............................. 2005-018037
Oct. 28, 2005  (JP)  ............................. 2005-314252

(51) Int. Cl.
*F02B 47/08* (2006.01)
*F02M 25/07* (2006.01)

(52) U.S. Cl. .................................. 123/568.21; 123/399

(58) Field of Classification Search ........... 123/568.21, 123/399, 396
See application file for complete search history.

(56) References Cited

U.S. PATENT DOCUMENTS 5,660,152 A * 8/1997 Masuda ................... 123/65 PE
2005/0066938 A1 * 3/2005 Iannone et al. ............. 123/396

FOREIGN PATENT DOCUMENTS

| JP | 2000-320347 | 11/2000 |
| JP | 2001-173464 | 6/2001 |
| JP | 2003-314377 | 11/2003 |

\* cited by examiner

*Primary Examiner*—Mahmoud Gimie
(74) *Attorney, Agent, or Firm*—Nixon & Vanderhye PC

(57) ABSTRACT

A valve control device corrects a change rate of an opening degree of a valve in accordance with engine rotation speed when deposit elimination operation is performed. The valve control device corrects an inclination between a positive maximum opening degree and a negative maximum opening degree of the valve in accordance with the engine rotation speed when the deposit elimination operation is performed. Thus, when the engine rotation speed is low and a noise accompanying the deposit elimination operation becomes more audible, the change rate of the opening degree of the valve is reduced. As a result, the noise accompanying the deposit elimination operation is reduced and annoyance for vehicle occupants is reduced.

20 Claims, 5 Drawing Sheets

VALVE CONTROL DEVICE REDUCING NOISE

CROSS REFERENCE TO RELATED APPLICATION

This application is based on and incorporates herein by reference Japanese Patent Application No. 2005-18037 filed on Jan. 26, 2005 and Japanese Patent Application No. 2005-314252 filed on Oct. 28, 2005.

BACKGROUND OF THE INVENTION

1. Field of the Invention

The present invention relates to a control device of a valve such as a throttle valve or an exhaust gas recirculation valve (EGR valve) installed in a fluid passage for performing air supply or gas exhaust with an engine.

2. Description of Related Art

A control device of a valve such as a throttle valve or an exhaust gas recirculation valve (EGR valve) installed in a fluid passage for performing air supply or gas exhaust with an engine performs deposit elimination operation with the valve in order to prevent malfunction due to deposits such as oil mist or soot adhering to a wall of the fluid passage.

The deposit elimination operation by the valve is performed by driving the valve across a fully-closed position of the valve when an influence of the operation of the valve over an operating state of the engine is very small, for example, when the engine is stopped. The valve is not only driven from the fully-closed position in a valve-opening direction but also driven from the fully-closed position in a valve-closing direction opposite to the valve-opening direction. Thus, the deposit on the fluid passage wall is scraped and eliminated (for example, as described in JP-A-2001-173464 or JP-A-2003-314377).

If the valve is driven near the fully-closed position, the valve and the fluid passage wall will rub against each other or excess torque will be applied to a gear portion of a motor that drives the valve. As a result, a noise will be caused. During a period suitable for the deposit elimination operation, engine rotation speed and engine torque are low and an engine noise is low, too. Therefore, the noise accompanying the deposit elimination operation reaches vehicle occupants and increases annoyance for the vehicle occupants.

SUMMARY OF THE INVENTION

It is therefore an object of the present invention to provide a control device of a valve located in a fluid passage for performing air supply or gas exhaust with an engine, the control device reducing annoyance due to a noise caused by deposit elimination operation.

According to an aspect of the present invention, a valve control device has a valve, an actuator, and a controller. The valve is located in a fluid passage for leading a fluid supplied to or discharged from an engine and regulates a flow rate of the fluid. The actuator drives the valve. The controller drives and controls the valve by controlling operation of the actuator. The controller drives the valve across a fully-closed position of the valve to eliminate a deposit adhering to a wall of the fluid passage when a predetermined operating condition of the engine is met. The controller drives the valve based on a driving pattern when the elimination of the deposit is performed. The driving pattern is changed in accordance with an engine state quantity representing a state of the engine.

Thus, the driving pattern such as driving speed or a driving range of the valve is changed in accordance with the engine state quantity such as engine rotation speed that affects engine sound. The driving speed of the valve is reduced to reduce a noise accompanying the deposit elimination operation when the engine rotation speed is low and the engine sound is low. The driving speed of the valve is increased to shorten a deposit elimination period when the engine sound is high and the noise accompanying the deposit elimination operation is less audible. As a result, annoyance due to a noise accompanying the deposit elimination operation can be reduced.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1A:
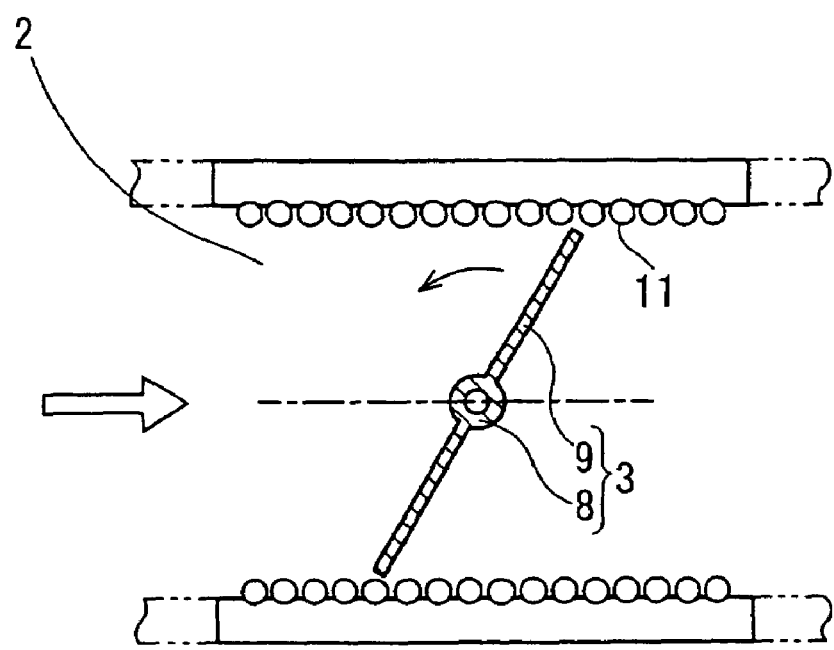
FIG. 1A is side view showing a valve control device according to a first embodiment of the present invention.
Figure 1B:
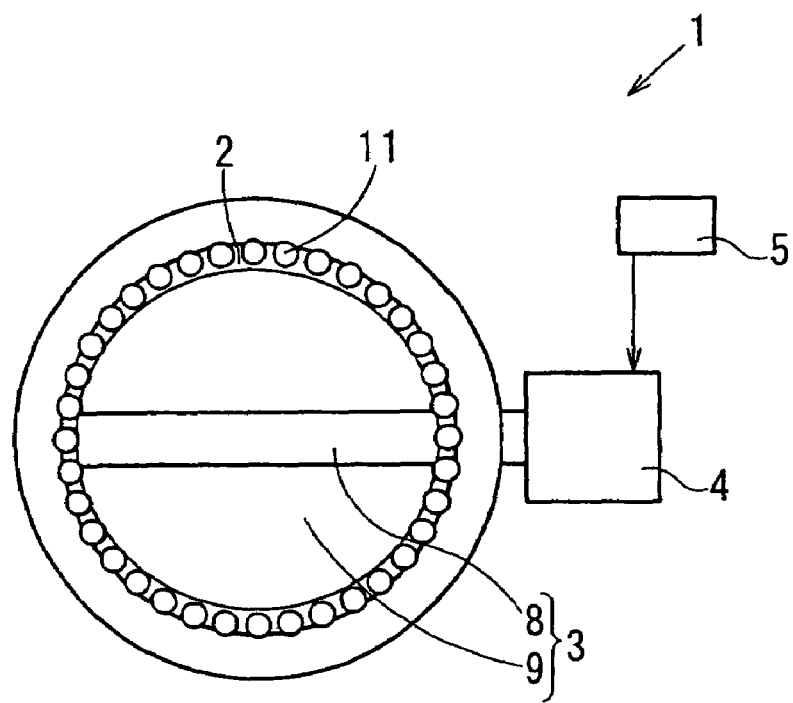
FIG. 1B is a front view showing the valve control device according to the first embodiment.

Referring to FIGS. 1A and 1B, a valve control device 1 according to a first embodiment of the present invention is illustrated. The valve control device 1 drives and controls a valve 3 such as a throttle valve, an exhaust gas recirculation valve (EGR valve) or an exhaust gas restriction valve located in a fluid passage 2, through which a fluid taken or discharged by an engine passes.

The valve control device 1 is installed to the fluid passage 2 that performs air intake or gas exhaust with the engine. The valve control device 1 has the valve 3, an electric motor 4, and an electronic control unit (ECU) 5. The valve 3 regulates a flow rate of the intake air or exhaust gas. The electric motor 4 is an actuator that drives the valve 3. The ECU 5 operates as a controller that drives and controls the valve 3 by controlling the operation of the electric motor 4.

For example, the valve 3 is a butterfly valve having a shaft portion 8 connected to a rotary shaft (not shown) of the electric motor 4 and a plate portion 9 substantially in a round shape. The axis of symmetry of the plate portion 9 coincides with the shaft portion 8. The valve 3 is driven and controlled to reach a driving position (referred to as an opening degree, hereinafter) corresponding to an operating state of the engine. If a certain operating condition of the engine is met, this driving position control of the valve 3 is stopped, and the valve 3 is controlled based on a specific shift pattern of the driving position in order to eliminate a deposit 11 adhering to a wall defining the fluid passage 2.

The elimination operation of the deposit 11 is performed by driving the valve 3 across a fully-closed position of the valve 3 (a state in which the opening degree of the valve 3 is zero). The valve 3 is not only driven from the fully-closed position in a valve-opening direction (direction in which the opening degree increases) but also driven from the fully-closed position in a valve-closing direction (direction in which the opening degree decreases) opposite to the valve-opening direction. Thus, the deposit 11 is scraped and eliminated by driving the valve 3 from a positive opening degree to a negative opening degree and from the negative opening degree to the positive opening degree.

The ECU 5 is a computer having a CPU equipped with a control function or a calculation function, a memory device such as ROM or RAM, and the like. The ECU 5 has a normal mode and a cleaning mode as control modes for controlling the driving position of the valve 3. The ECU 5 switches between the two control modes in accordance with the operating condition of the engine.

The normal mode drives and controls the valve 3 to an opening degree corresponding to the operating state of the engine, for example, in a normal running period.

The cleaning mode drives and controls the valve 3 to follow a specific shift pattern of the opening degree (cleaning opening degree pattern) in order to eliminate the deposit 11.

The cleaning mode is performed when a predetermined operating condition of the engine is met. The predetermined operating condition is a condition that an influence of the change in the opening degree of the valve 3 over the operating state of the engine becomes very small. The predetermined operating condition is provided when the engine is stopped, when the engine is started, or when fuel is cur to reduce the speed (in deceleration fuel cutting period), for example.

The cleaning opening degree pattern is determined by a number the valve 3 is driven to reciprocate across the fully-closed position, a driving range (opening degree amplitude) of the valve 3, increasing (or decreasing) speed of the opening degree and the like. The number, the amplitude, the speed and the like are determined based on an operation history related to a quantity or quality of the deposit 11, engine cooling water temperature and the like. A factor such as the number, the amplitude, the speed or the like determining the cleaning opening degree pattern is referred to as a driving pattern hereinafter.

The valve control device 1 of the first embodiment monitors engine state quantities representing the states of the engine and modifies the cleaning opening degree pattern by changing the driving pattern in accordance with the engine state quantities even after the control mode is switched to the cleaning mode. In this embodiment, out of the various driving patterns, the driving speed of the valve 3 at the time when the deposit 11 is eliminated (opening degree increasing speed or opening degree decreasing speed) is corrected in accordance with engine rotation speed that is one of the engine state quantities. The opening degree increasing speed or the opening degree decreasing speed is referred to as an opening degree change rate hereinafter.

Figure 2:
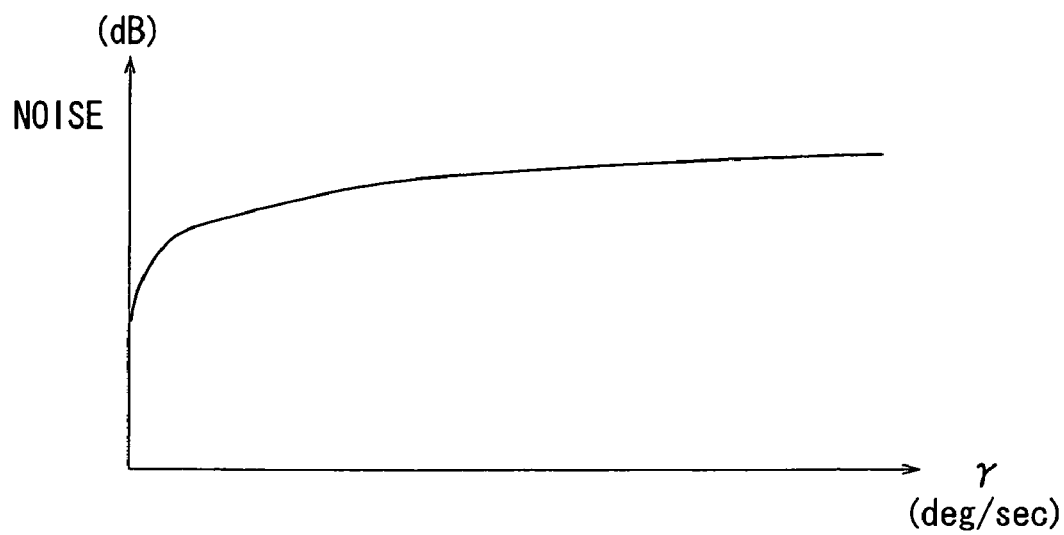
FIG. 2 is a graph showing a relationship between a change rate of an opening degree and a noise according to the first embodiment.

A noise accompanying the elimination of the deposit 11 increases as the opening degree change rate r increases as shown in FIG. 2. In an area "A" shown in FIG. 3 where the engine rotation speed (RPM) and engine torque are low and an engine sound is also low (for example, when the engine is stopped), the opening degree change rate r is corrected to a smaller value. Thus, annoyance for vehicle occupants due to the noise accompanying the elimination of the deposit 11 can be reduced.

Figure 3:
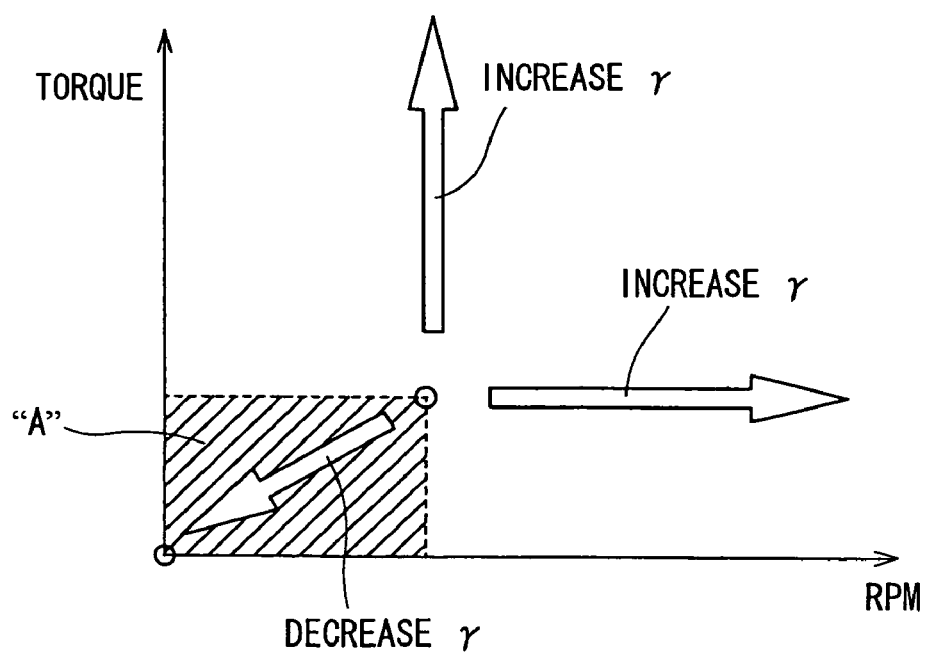
FIG. 3 is a graph showing relationships among engine rotation speed, engine torque and a correcting manner of the change rate of the opening degree according to the first embodiment.

In the other area than the area "A" shown in FIG. 3, or in the area where the engine rotation speed RPM and the engine torque are high and the engine sound is high (for example, in the deceleration fuel-cutting period), the noise accompanying the elimination of the deposit 11 is less audible to the vehicle occupants. Accordingly, there is a low possibility that the vehicle occupants feel annoyance due to the noise accompanying the elimination of the deposit 11. There is little necessity to correct the opening degree change rate r to a smaller value. In such a case, the opening degree change rate r may be corrected to a larger value to shorten the elimination period.

Figure 4:
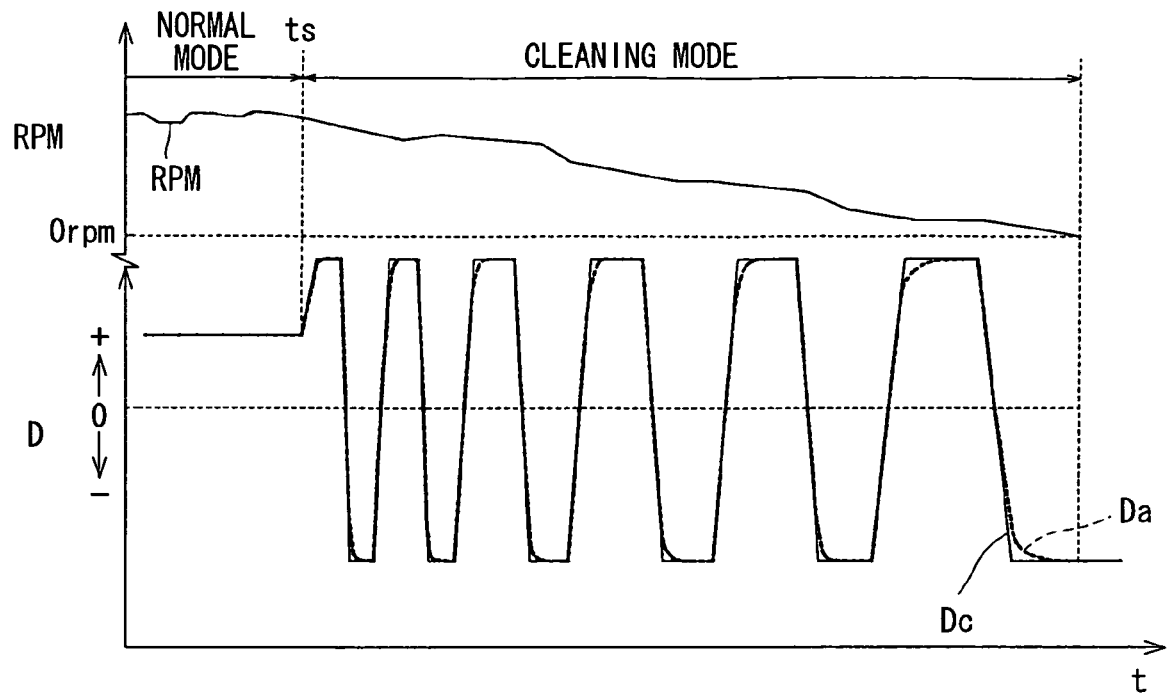
FIG. 4 is a time chart showing a control mode, the engine rotation speed, a cleaning opening degree pattern and an actual opening degree according to the first embodiment.

In the first embodiment, the control mode is switched from the normal mode to the cleaning mode and the control based on the cleaning opening degree pattern Dc is started when the engine stop is started at timing ts shown in FIG. 4. In FIG. 4, a note D represents the opening degree of the valve 3 and Da is an actual opening degree of the valve 3. The initial cleaning opening degree pattern is modified so that an inclination between the positive maximum opening degree and the negative maximum opening degree becomes gentle in accordance with the decrease in the engine rotation speed RPM as shown in FIG. 4. Thus, the opening degree change rate r is corrected and gradually reduced in accordance with the engine rotation speed RPM.

The valve control device 1 of the first embodiment drives the valve 3 across the fully-closed position when a predetermined operating condition of the engine is met. Thus, the deposit 11 adhering to the wall defining the fluid passage 2 can be eliminated. The valve control device 1 corrects the opening degree change rate of the valve 3 in accordance with the engine rotation speed when the elimination of the deposit 11 is performed.

A period suitable for eliminating the deposit 11 is, for example, an engine stopping period in which the engine rotation speed is low and the engine sound is low. In such a period, the noise accompanying the elimination of the deposit 11 is relatively audible to vehicle occupants. Therefore, the opening degree change rate of the valve 3 during the elimination of the deposit 11 is corrected in accordance with the engine rotation speed. Thus, in the period in which the engine rotation speed is low and the noise accompanying the elimination of the deposit 11 becomes unpleasant, the opening degree change rate of the valve 3 is decreased to reduce the annoyance ascribable to the noise accompanying the elimination of the deposit 11.

The opening change rate may be set relatively low from the start of the engine stop in the case where only the reduction of the annoyance due to the noise is taken into consideration. However, the time necessary to eliminate the deposit 11 extends as the opening degree change rate decreases. If the opening degree change rate is low, the electric motor 4 and the like have to be operated or the ECU 5 has to be energized for a long time after the start of the engine stop. In such a case, a buttery (not shown) will be wasted, and the vehicle occupants will feel uncomfortably. Therefore, it is preferable to change the opening degree change rate in accordance with the engine state quantity such as the engine rotation speed.

Figure 5:
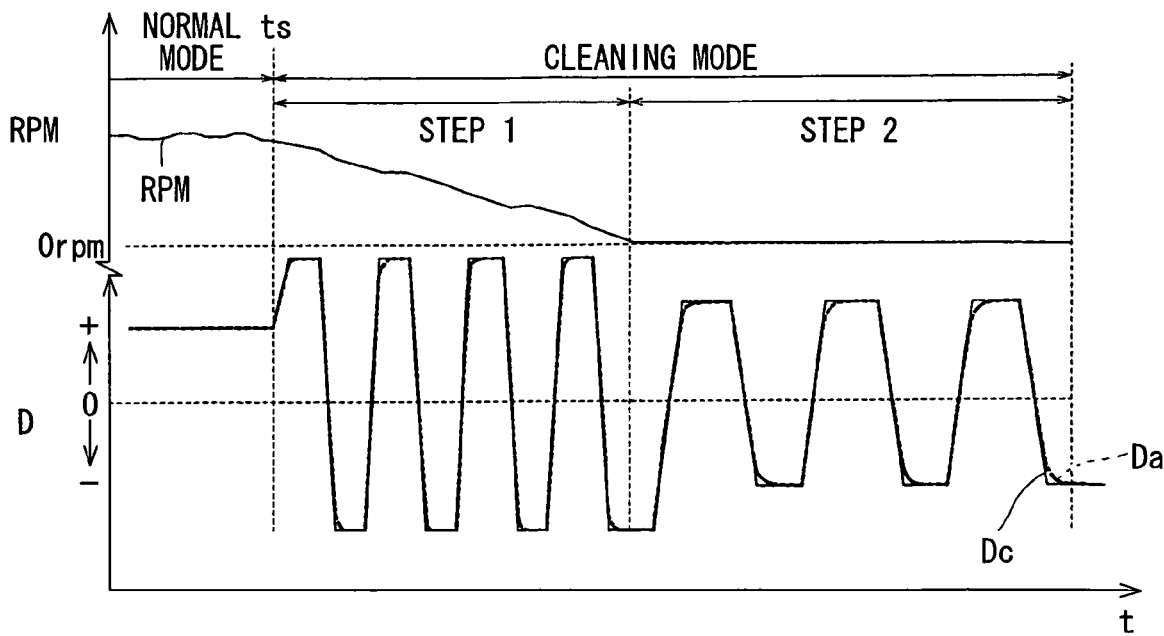
FIG. 5 is a time chart showing a control mode, engine rotation speed, a cleaning opening degree pattern and an actual opening degree according to a second embodiment of the present invention.

Referring to FIG. 5, a control mode of a valve control device 1 according to a second embodiment of the present invention is illustrated. As shown in FIG. 5, the cleaning mode and the cleaning opening degree pattern are divided in two steps. The cleaning mode is divided into a first step in which the engine rotation speed RPM decreases to zero after the start of the engine stop and a second step in which the engine rotation speed RPM is zero. In this embodiment, the opening degree change rate and a driving range (opening degree amplitude) of the valve 3 during the elimination of the deposit 11 are selected from the driving patterns, and are corrected in accordance with the engine rotation speed.

The opening degree amplitude of the second step is set smaller than that of the first step. More specifically, the opening degree amplitude at the time when the engine rotation speed is zero is set smaller than the opening degree amplitude at the time when the engine rotation speed is greater than zero. The opening degree change rate in the second step is set smaller than the opening degree change rate in the first step. More specifically, the opening degree change rate at the time when the engine rotation speed is zero is set smaller than the opening degree amplitude at the time when the engine rotation speed is greater than zero. Thus, in this embodiment, in addition to the opening degree change rate of the valve 3, the opening degree amplitude is changed in accordance with the engine rotation speed.

In this embodiment, the control mode is switched from the normal mode to the first step of the cleaning mode at the start of the engine stop. If the engine rotation speed becomes zero, the control is switched from the first step to the second step, and the opening degree change rate and the opening degree amplitude are decreased.

Thus, the valve control device 1 of this embodiment changes the opening degree change rate and the opening degree amplitude of the valve 3 in accordance with the engine rotation speed during the elimination of the deposit 11. As a result, the annoyance due to the noise accompanying the elimination of the deposit 11 can be reduced further.

Figure 6:
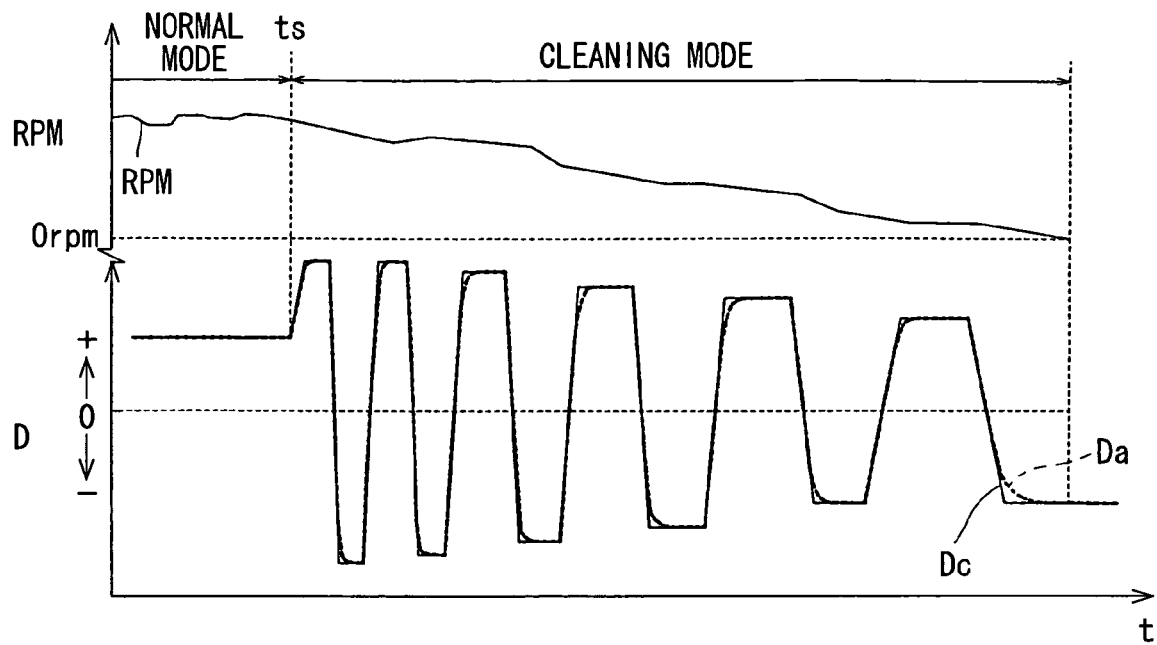
FIG. 6 is a time chart showing a control mode, engine rotation speed, a cleaning opening degree pattern and an actual opening degree according to a third embodiment of the present invention.

Referring to FIG. 6, a control mode performed by a valve control device 1 according to a third embodiment of the present invention is illustrated. The valve control device 1 of this embodiment changes the valve opening degree change rate and the opening degree amplitude of the valve 3 in accordance with the engine rotation speed RPM when the elimination of the deposit 11 is performed. Even after the control mode is switched to the cleaning mode, the engine rotation speed RPM is monitored, and the opening degree change rate and the opening degree amplitude are corrected in accordance with the engine rotation speed RPM. Thus, in the cleaning opening degree pattern of this embodiment, both of the opening degree change rate and the opening degree amplitude are corrected to gradually decrease in accordance with the engine rotation speed RPM as shown in FIG. 6. As a result, the annoyance due to the noise accompanying the elimination of the deposit 11 can be further reduced when the engine rotation speed is low.

Figure 7:
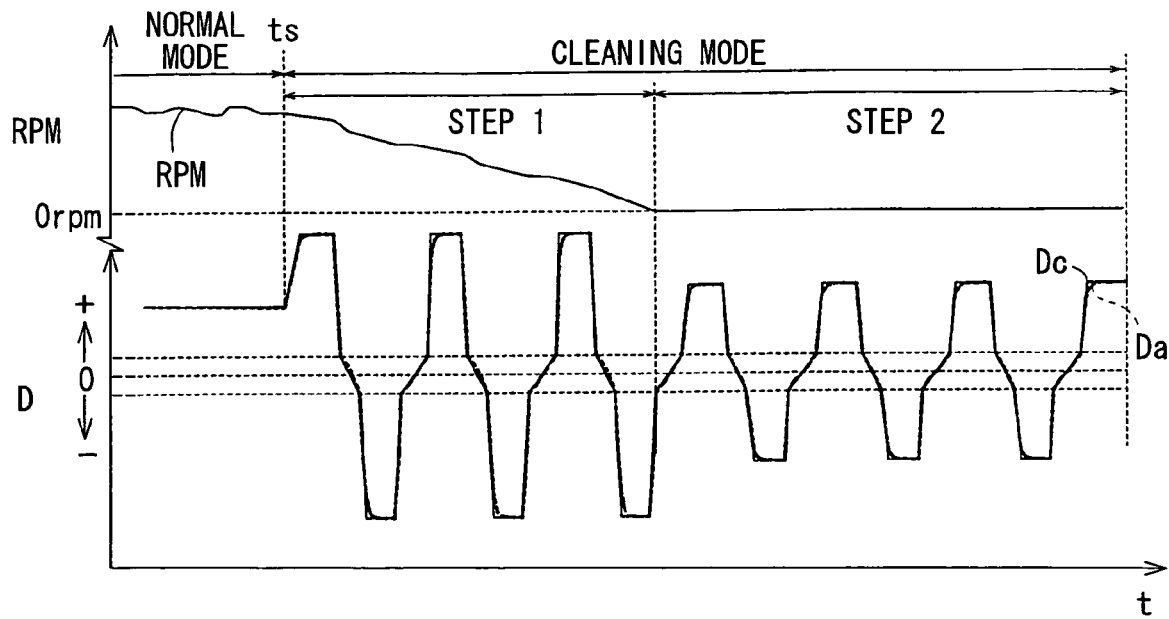
FIG. 7 is a time chart showing a control mode, engine rotation speed, a cleaning opening degree pattern and an actual opening degree according to a fourth embodiment of the present invention.

Referring to FIG. 7, a control mode performed by a valve control device 1 according to a fourth embodiment of the present invention is illustrated. As shown in FIG. 7, the cleaning mode and the cleaning opening degree pattern are divided in two steps. The opening degree change rate and the opening degree amplitude are reduced when the control mode is switched from the first step to the second step of the cleaning mode. The cleaning opening degree pattern of this embodiment is set so that the inclination between the positive opening degree and the negative opening degree is gentle near the opening degree D of zero compared to the other opening degree D as shown in FIG. 7. Thus, the opening degree change rate is changed in accordance with the opening degree D (driving position) of the valve 3.

The noise is caused when the valve 3 and the wall providing the fluid passage 2 rub against each other or when excess torque is caused in gears and the like of the electric motor 4 due to the rubbing during the elimination of the deposit 11. Such a phenomenon occurs in a very narrow range of the opening degree D of the valve 3 including the opening degree D of zero (fully-closed position).

The valve control device 1 of this embodiment can reduce the opening degree change rate of the valve 3 when the valve 3 is in the very narrow range where the noise can be caused. The valve control device 1 can increase the valve opening degree change rate when the valve 3 is in the opening degree range where the noise is not caused. As a result, the annoyance due to the noise accompanying the elimination of the deposit 11 can be further reduced, and the elimination period can be shortened.

Figure 8A:
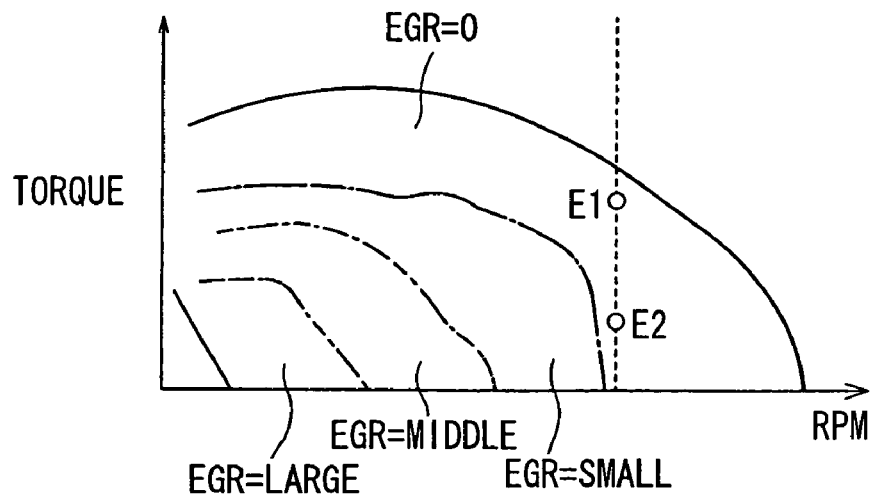
FIG. 8A is a diagram showing correlation among an exhaust gas recirculation rate, engine rotation speed and engine torque according to a fifth embodiment of the present invention.

Referring to FIG. 8, a control mode performed by a valve control device 1 according to a fifth embodiment of the present invention is illustrated. The valve control device 1 of this embodiment changes the opening degree change rate and the opening degree amplitude in accordance with the engine torque that is one of the engine state quantities as shown in FIG. 8. The valve control device of this embodiment drives and controls an EGR valve as the valve 3.

The EGR valve performs the elimination of the deposit 11 in a range in which an exhaust gas recirculation rate (EGR rate) of EGR gas (recirculated exhaust gas) is zero. In the case where the EGR valve performs the deposit elimination, the opening degree change rate and the opening degree amplitude are changed in accordance with the engine torque. States E1 and E2 shown in FIG. 8 are in the area where the EGR rate is zero (EGR=0). The engine rotation speed RPM is the same at the states E1 and E2. The engine torque is higher at the state E1 than at the state E2.

The engine sound increases as the engine torque increases. Accordingly, the noise accompanying the deposit elimination becomes less audible to the vehicle occupants as the engine torque increases. The annoyance due to the noise accompanying the deposit elimination is lower at the state E1 than at the state E2. Therefore, the opening degree change rate and the opening degree amplitude are larger in the cleaning opening degree pattern (shown in FIG. 8B) at the state E1 than in the cleaning opening degree pattern (shown in FIG. 8C) at the state E2.

Figure 8B:
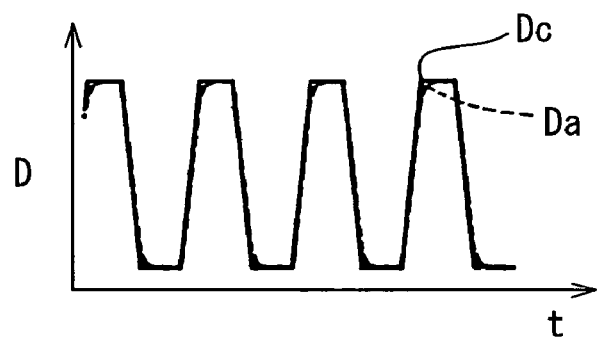
FIG. 8B is a time chart showing a cleaning opening degree pattern and an actual opening degree in a high engine torque period according to the fifth embodiment.
Figure 8C:
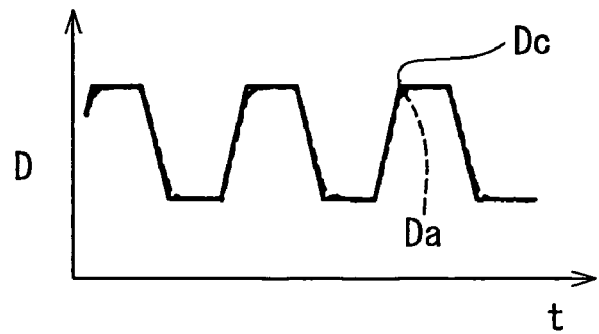
FIG. 8C is a time chart showing the cleaning opening degree pattern and the actual opening degree in a low engine torque period according to the fifth embodiment.

If the engine state changes from the state E2 to the state E1 when the deposit elimination is performed, the opening degree change rate and the opening degree amplitude are corrected to larger values, and the cleaning opening degree pattern shown in FIG. 8C is modified into the cleaning opening degree pattern shown in FIG. 8B. If the engine state changes from the state E1 to the state E2 when the deposit elimination is performed, the opening degree change rate and the opening degree amplitude are corrected to smaller values, and the cleaning opening degree pattern shown in FIG. 8B is modified into the cleaning opening degree pattern shown in FIG. 8C.

In the cleaning opening degree pattern according to the first or third embodiment, the opening degree change rate is continuously and gradually decreased. Alternatively, the opening degree change rate may be decreased stepwise.

The pattern of the fourth embodiment for changing the opening degree change rate in accordance with the opening degree of the valve 3 may be applied to any cleaning opening degree pattern.

In the cleaning opening degree pattern according to the second or fourth embodiment, the opening degree amplitude is reduced in two steps. In the cleaning opening degree pattern according to the third embodiment, the opening degree amplitude is continuously and gradually reduced. Alternatively, the opening degree amplitude may be reduced in three or more steps.

In the case where the cleaning opening degree pattern is corrected in accordance with the engine torque as in the fifth embodiment, the opening degree change rate may be changed in accordance with the opening degree of the valve 3 like the fourth embodiment, in addition to changing the opening degree change rate and the opening degree amplitude in accordance with the engine torque.

In the fifth embodiment, the deposit elimination is performed in the range in which the EGR rate is zero. Alternatively, the deposit elimination may be performed in other ranges. For example, the cleaning mode may be performed when the normal fuel injection is performed to supply the fuel to the engine and the EGR gas is recirculated to an intake side of the engine, instead of the deceleration fuel-cutting period and the like. Thus, the EGR valve can eliminate the deposit adhering around a bearing anytime.

In the case where the cleaning mode is performed when the normal fuel injection is performed, it is preferable to eliminate the deposit by driving the EGR valve in a range capable of maintaining substantially the same flow rate of the EGR gas. The state in which the flow rate of the EGR gas is substantially the same is a state in which a deviation with respect to a target value of the EGR rate is between −20 and +20 when the target value is 100, for example. The upper limit value of the absolute value of the deviation may be varied in accordance with the permissible limit value of the exhaust gas emission, and may be set smaller than 20 (for example, 15, 10, or 5). The state in which the flow rate of the EGR gas is substantially the same includes a state in which an average flow rate provided when the EGR valve is driven across a predetermined driving position (for example, the fully-closed position) is substantially the same.

The present invention should not be limited to the disclosed embodiments, but may be implemented in many other ways without departing from the spirit of the invention.

What is claimed is:

1. A valve control device, comprising:
    a valve that is located in a fluid passage for leading a fluid supplied to or discharged from an engine and that regulates a flow rate of the fluid;
    an actuator that drives the valve; and
    a controller that drives and controls the valve by controlling operation of the actuator, wherein the controller drives the valve across a fully-closed position of the valve to eliminate a deposit adhering to a wall of the fluid passage when a predetermined operating condition of the engine is met, and
    the controller changes a driving pattern of the valve at the time when the elimination of the deposit is performed by driving the valve across the fully-closed position in accordance with an engine state quantity representing a state of the engine.

2. The valve control device as in claim 1, wherein the driving pattern is at least one of a driving range and driving speed of the valve at the time when the elimination of the deposit is performed.

3. The valve control device as in claim 2, wherein the driving range is changed in accordance with the engine state quantity.

4. The valve control device as in claim 2, wherein the driving speed is changed in accordance with a driving position of the valve.

5. The valve control device as in claim 4, wherein the driving speed is reduced near the fully-closed position of the valve.

6. The valve control device as in claim 1, wherein the engine state quantity is engine rotation speed.

7. The valve control device as in claim 6, wherein at least one of a driving range and driving speed of the valve at the time when the elimination of the deposit is performed is gradually decreased as the engine rotation speed decreases.

8. The valve control device as in claim 6, wherein at least one of a driving range and driving speed of the valve at the time when the elimination of the deposit is performed is decreased stepwise as the engine rotation speed decreases.

9. The valve control device as in claim 6, wherein at least one of a driving range and driving speed of the valve at the time when the elimination of the deposit is performed is gradually increased as the engine rotation speed increases.

10. The valve control device as in claim 6, wherein at least one of a driving range and driving speed of the valve at the time when the elimination of the deposit is performed is increased stepwise as the engine rotation speed increases.

11. The valve control device as in claim 1, wherein the engine state quantity is engine torque.

12. The valve control device as in claim 11, wherein at least one of a driving range and driving speed of the valve at the time when the elimination of the deposit is performed is decreased as the engine torque decreases.

13. The valve control device as in claim 11, wherein at least one of a driving range and driving speed of the valve at the time when the elimination of the deposit is performed is increased as the engine torque increases.

14. The valve control device as in claim 1, wherein the predetermined operating condition is met when a quantity of fuel supplied to the engine is zero.

15. The valve control device as in claim 1, wherein the predetermined operating condition is met when the engine is started.

16. The valve control device as in claim 1, wherein the predetermined operating condition is met when the engine is stopped.

17. The valve control device as in claim 1, wherein the predetermined operating condition is met when the flow rate of the fluid is zero.

18. A valve control device, comprising:
    a valve that is located in a fluid passage for leading a fluid supplied to or discharged from an engine and that regulates a flow rate of the fluid;
    an actuator that drives the valve; and a controller that drives and controls the valve by controlling operation of the actuator, wherein the controller drives the valve across a fully-closed position of the valve to eliminate a deposit adhering to a wall of the fluid passage when a predetermined operating condition of the engine is met, the valve is an exhaust gas recirculation valve that regulates a flow rate of exhaust gas recirculated into an air intake side of the engine, and the controller drives the exhaust gas recirculation valve in a range capable of maintaining the flow rate of the recirculated exhaust gas at substantially the same value when the controller drives the valve across the fully-closed position of the valve to eliminate the deposit.

19. The valve control device as in claim 18, wherein the predetermined operating condition is met when fuel is supplied to the engine.

20. The valve control device as in claim 18, wherein the predetermined operating condition is met when the exhaust gas is recirculated into the air intake side of the engine.

* * * * *